United States Patent
Ringk

(10) Patent No.: US 10,923,692 B2
(45) Date of Patent: Feb. 16, 2021

(54) BATTERY CELL WITH HOUSING COMPONENTS WHICH ARE ADHESIVELY BONDED TO ONE ANOTHER IN A SEALED MANNER BY A THREE-LAYER ADHESIVE COMPOSITE, AND METHOD AND APPARATUS FOR MANUFACTURING SAID BATTERY CELL

(71) Applicant: Robert Bosch GmbH, Stuttgart (DE)

(72) Inventor: Andreas Ringk, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 16/317,919

(22) PCT Filed: Jul. 7, 2017

(86) PCT No.: PCT/EP2017/067124
§ 371 (c)(1),
(2) Date: Jan. 15, 2019

(87) PCT Pub. No.: WO2018/015184
PCT Pub. Date: Jan. 25, 2018

(65) Prior Publication Data
US 2019/0296277 A1    Sep. 26, 2019

(30) Foreign Application Priority Data

Jul. 19, 2016  (DE) ........................ 10 2016 213 138

(51) Int. Cl.
| | |
|---|---|
| *H01M 2/08* | (2006.01) |
| *H01M 2/02* | (2006.01) |
| *H01M 10/04* | (2006.01) |

(52) U.S. Cl.
CPC ............. *H01M 2/08* (2013.01); *H01M 2/024* (2013.01); *H01M 2/0217* (2013.01);
(Continued)

(58) Field of Classification Search
CPC ...... H01M 2/08; H01M 2/0217; H01M 2/024; H01M 10/0404; H01M 10/0413; H01M 10/0436
See application file for complete search history.

(56) References Cited

U.S. PATENT DOCUMENTS

| | | | |
|---|---|---|---|
| 4,623,599 A | 11/1986 | Vourlis | |
| 2006/0127760 A1 | 6/2006 | Hatta et al. | |
| 2007/0202398 A1* | 8/2007 | Kim ...................... | H01M 2/021 429/176 |

FOREIGN PATENT DOCUMENTS

| | | |
|---|---|---|
| DE | 3150944 | 6/1983 |
| DE | 102014018996 | 6/2016 |

(Continued)

OTHER PUBLICATIONS

International Search Report for Application No. PCT/EP2017/067124 dated Oct. 6, 2017 (English Translation, 2 pages).

*Primary Examiner* — Jimmy Vo
(74) *Attorney, Agent, or Firm* — Michael Best & Friedrich LLP

(57) ABSTRACT

A battery cell (1) has electrodes (9), an electrolyte (7) and a housing (3) surrounding the electrodes (9) and the electrolytes (7). The housing (3) is composed of a plurality of housing components (11) adhesively bonded to one another by an adhesive composite (13) along opposite abutment faces (21). The adhesive composite (13) has a first adhesive composite component (15) which is interposed between the opposite abutment faces (21) and which is resistant and impermeable to the electrolyte (9); a second adhesive composite component (17) which is over regions of the two housing components (11) adjacent to the first adhesive composite component (15), and which is composed of a cured material; and a third adhesive composite component (19) which is over regions of the two housing components (Continued)

(11) adjacent to the second adhesive composite component (17) and which is impermeable to water and/or oxygen.

12 Claims, 2 Drawing Sheets

(52) U.S. Cl.
CPC .... *H01M 10/0404* (2013.01); *H01M 10/0413* (2013.01); *H01M 10/0436* (2013.01); *H01M 2002/0297* (2013.01); *H01M 2220/20* (2013.01)

(56) References Cited

FOREIGN PATENT DOCUMENTS

| | | |
|---|---|---|
| EP | 2333869 | 6/2011 |
| JP | S53143985 U | 11/1978 |
| JP | S5559468 U | 4/1980 |
| JP | S6039419 U | 3/1985 |
| JP | S61156176 U | 9/1986 |
| JP | H04167351 A | 6/1992 |
| JP | 2000251854 | 9/2000 |
| JP | 2002184364 | 6/2002 |
| JP | 2005209819 A | 8/2005 |

\* cited by examiner

BATTERY CELL WITH HOUSING COMPONENTS WHICH ARE ADHESIVELY BONDED TO ONE ANOTHER IN A SEALED MANNER BY A THREE-LAYER ADHESIVE COMPOSITE, AND METHOD AND APPARATUS FOR MANUFACTURING SAID BATTERY CELL

BACKGROUND OF THE INVENTION

The present invention relates to a battery cell and to a method and an apparatus for its manufacture.

Batteries, sometimes also referred to as accumulators, are used for the electrochemical storage of energy. The stored energy may be released again for various purposes in the form of electrical power, for example in electric or hybrid motor vehicles or for various mobile applications.

In general, at least two electrodes and an electrolyte are contained in a battery cell. Depending on the type and material of the electrodes and of the electrolyte, distinction is made between various types of batteries, for example lithium ion batteries, nickel/metal hydride batteries, etc. In general, distinction is furthermore made between battery cells which have a solid housing and are often referred to as prismatic battery cells, and those without a solid housing, in which the electrodes are contained for example in a bag formed from a film and which are often referred to as pouch bag battery cells.

Conventionally, the housing of prismatic battery cells is usually composed of a plurality of housing components, for example a pot-shaped lower component and a lid-like upper component, or alternatively of two housing halves. In conventional manufacturing methods, the housing components are in this case usually soldered or welded to one another, in order to connect them to one another on the one hand in a geometrically stable way and on the other hand in a leaktight manner and therefore while being protected against leakage of the often liquid electrolyte.

However, such soldering or welding requires significant outlay of labor, energy and/or cost. Furthermore, during the aforementioned material-fit connecting methods, significant heat is introduced into the battery cell, which in the case of inadequately configured method management may lead to local overheating inside the battery cell and possibly to damage to its components, in particular the electrolyte.

SUMMARY OF THE INVENTION

Embodiments of the present invention may advantageously permit a battery cell, in particular a prismatic lithium ion battery cell, in which a housing is sufficiently mechanically stable and leaktight, and the housing can be manufactured simply, economically and/or without significant risk of damage because of excessive heat introduction.

According to a first aspect of the invention, a battery cell is proposed which comprises electrodes, an electrolyte, and a housing which encloses the electrodes and the electrolyte. The housing is composed of at least two housing components. The battery cell is distinguished in that the housing components are adhesively bonded to one another in a sealed manner by a preferably at least three-layer adhesive composite along mutually opposing abutment faces. The adhesive composite in this case comprises a first, a second and a third adhesive composite component. The first adhesive composite component is interposed between the mutually opposing abutment faces of the two housing components and is resistant and impermeable to the electrolyte. The second adhesive composite component is applied from the outside over the first adhesive composite component and over regions, adjacent to the first adhesive composite component, of the two housing components and consists of a fluidly processable, cured material. The third adhesive composite component is applied from the outside over the second adhesive composite component and over regions, adjacent to the second adhesive composite component, of the two housing components and is water-impermeable and/or oxygen-impermeable.

According to a second aspect of the invention, a method for manufacturing a housing for a battery cell is proposed. The method comprises the following steps, preferably in the order indicated: provision of a plurality of housing components, which when assembled form the housing; arrangement of two housing components in such a way that they oppose one another along abutment faces; adhesive bonding of the housing components to one another by means of an adhesive bonding process along the mutually opposing abutment faces by an adhesive composite. In this case, the adhesive bonding process comprises the following steps, preferably in the order indicated: interposition of a first adhesive composite component between the mutually opposing abutment faces of the two housing components, the first adhesive composite component being resistant to an electrolyte, to be contained in the housing, of the battery cell; application of a second adhesive composite component from the outside over the first adhesive composite component and over regions, adjacent to this first adhesive composite component, of the two housing components, the second adhesive composite component consisting of a fluidly processable, curable material, which is fluidly applied and then cured; and application of a third adhesive composite component from the outside over the second adhesive composite component and over regions, adjacent to the second adhesive composite component, of the two housing components, the third adhesive composite component being water-impermeable and/or oxygen-impermeable.

According to a third aspect of the invention, an apparatus for manufacturing a housing for a battery cell is proposed. The apparatus comprises a holding device for holding two housing components in such a way that they oppose one another along abutment faces, and an adhesive bonding device for adhesive bonding of the housing components to one another along the mutually opposing abutment faces by an adhesive composite. In this case, the adhesive bonding device comprises a first delivery unit, a second delivery unit and a third delivery unit. The first delivery unit is configured for delivery and interposition of a first adhesive composite component between the mutually opposing abutment faces of the two housing components, the first adhesive composite component being resistant to an electrolyte, to be contained in the housing, of the battery cell. The second delivery unit is configured for delivery and application of a second adhesive composite component from the outside over the first adhesive composite component and over regions, adjacent to this first adhesive composite component, of the two housing components, the second adhesive composite component consisting of a fluid, curable material. The third delivery unit is configured for delivery and application of a third adhesive composite component from the outside over the second adhesive composite component and over regions, adjacent to the second adhesive composite component, of the two housing components, the third adhesive composite component being water-impermeable and/or oxygen-impermeable.

Ideas of embodiments of the present invention may, inter alia, be regarded as being based on the concepts and discoveries described below.

In order to avoid labor- and cost-intensive processing steps and excessive heat introduction into the battery cell when connecting housing components in order to manufacture a housing of a battery cell, it is proposed not to weld or solder the housing components but to connect them to one another by a suitably configured adhesive bonding process. In this case, an adhesive bonding carried out in the scope of the adhesive bonding process should lead to a geometrically stable connection of two neighboring housing components and also ensure that the housing components are permanently connected to one another in a leaktight manner, so that neither electrolyte can emerge from the battery cell interior enclosed by the housing, nor for example contamination, for example water or oxygen, can penetrate into the interior of the battery cell from the outside.

It has in this case been found that these various requirements require different and even sometimes conflicting properties of the adhesive bonding. It is therefore regarded as difficult to carry out the adhesive bonding by means of merely a single adhesive component, i.e. merely for example an adhesive. Instead, it is regarded as advantageous to configure the adhesive bonding as an adhesive composite, which is composed of at least three different adhesive composite components. Each of the adhesive composite components may then be configured in an optimized way for particular requirements.

For example, the first adhesive composite component may be configured in an optimized way to be able to form an innermost layer, which therefore where applicable comes directly in contact with the electrolyte, of the adhesive composite. To this end, the first adhesive composite component should be resistant to the electrolyte. Electrolytes used in battery cells may in this case regularly contain aggressive substances, for example hydrogen fluoride (HF).

In this context, resistant can mean that the first adhesive composite component is essentially not damaged during contact with the electrolyte, and in particular that the material of the first adhesive composite component does not chemically react with the electrolyte, is not attacked by it and/or essentially does not swell during contact with it (i.e. by more than 5 vol % or more than 10 vol %, for example).

Furthermore, the first adhesive composite component should as far as possible be impermeable to the electrolyte. In other words, the electrolyte, or substances released from the latter, should not be able to pass through the first adhesive composite component in substantial amounts, in particular not in harmful amounts, and for example reach overlying adhesive composite components or even escape into an environment.

Furthermore, the first adhesive composite component should be configured in an optimized way in order to lead to a mechanically geometrically stable connection between the housing components, or at least assist this to a significant extent.

According to one embodiment, the first adhesive composite component has an essentially T-shaped cross section. The first adhesive composite component may, for example, be provided in the form of an elongate tape which is essentially T-shaped in cross section, and suitably interposed between the two housing components.

The term "T-shaped" is in this case intended to be interpreted in a broad sense, and in general to cover geometries which have a first branch (referred to below as the vertical branch) and two second branches (referred to below as transverse branches) protruding transversely from this first branch on opposite sides of the first branch. According to this definition, for example, a "Y" may also be understood here as essentially T-shaped.

The vertical branch may in this case be interposed between the mutually opposing abutment faces of the two housing components, so that these housing components are kept separated from one another. The abutment faces may in this case respectively adjoin a surface of the vertical branch directly. The transverse branches may be used to position the two housing components relative to the first adhesive composite component, and therefore also relative to one another, in the desired manner.

According to one embodiment, the housing components consist of an electrically conductive material, in particular of metal. The housing components may in this case ensure sufficient mechanical strength of the housing, although they may also be used as externally contactable electrodes for the battery cell.

According to one embodiment, the first adhesive composite component is formed with an electrically insulating material. The first adhesive composite component may therefore be used to electrically insulate housing components adjacent thereto from one another. Neighboring housing components which are kept electrically insulated from one another by an interposed first adhesive composite component may therefore act as different electrodes of the battery cell.

According to one embodiment, the first adhesive composite component is formed with polytetrafluoroethylene. Polytetrafluoroethylene (PTFE—sometimes also referred to as Teflon®) is chemically highly stable and, for example, resistant and leaktight to hydrogen fluoride.

As an alternative, other chemically stable and/or electrically insulating materials may also be used in order to form the first adhesive composite component, for example plastics, in particular polypropylene (PP) or polyethylene (PE). Strongly crosslinked plastics, for example epoxides, may also be used.

The second adhesive composite component should consist of a fluidly processable and curable material, so that it can be applied in the liquid state from the outside over the previously introduced first adhesive composite component as well as regions, adjacent thereto, of the two housing components, i.e. for example poured, sprayed, applied dropwise or dispensed in another way, and can subsequently be cured. In the liquid state, the second adhesive component may therefore flow well into any cavities and close them in a leaktight manner after curing. The second adhesive component should in this case preferably be able to bond adhesively to the first adhesive component and/or to the housing components. After the curing, the second adhesive component can therefore fix the first adhesive component and the two housing components to one another, and reinforce relative positioning between them. Furthermore, the second adhesive component should preferably be sufficiently resistant to attack by electrolyte, particularly if the first adhesive component cannot absolutely ensure that electrolyte does not reach as far as the second adhesive component.

According to one embodiment, the second adhesive composite component is formed with epoxy resin. Epoxy resin is regarded as outstandingly suitable for fulfilling the aforementioned requirements of the second adhesive composite component. Furthermore, epoxy resin can be processed simply, with no risk and/or on an industrial scale. As an alternative, however, it is also possible to use other fluidly processable and curable materials, in particular strongly crosslinking polymers, as the second adhesive composite component. In particular, acrylates may for example be used.

The third adhesive composite component is, in particular, intended to protect against ingress of water and/or oxygen as a barrier. Particularly in the case of lithium ion batteries, it is necessary to reliably prevent foreign substances, in particular water or oxygen, from being able to enter inside the battery cell, since otherwise undesired chemical reactions may take place. The third adhesive component should therefore consist of a suitable water- and/or oxygen-impermeable material, or comprise at least one continuous layer of such a material. Such a third adhesive component may then be applied from the outside over the previously applied second, preferably already cured, adhesive component, and as far as possible also overlap the edges of the latter and therefore abut with adjacent regions of the two housing components. By means of an adhesive composite equipped in this way with the third adhesive component, essentially no water and/or no oxygen, at least no amounts of water and/or oxygen that potentially damage or endanger the battery cell, coming from the outside are intended to be able to cross the adhesive composite and enter the interior of the battery cell. Preferably, the third adhesive composite component is impermeable both for water and for oxygen. If, however, for example, one of the other adhesive composite components is impermeable for water or oxygen, it may be sufficient for the third adhesive composite component only to be impermeable for the respective other of these two substances.

According to one embodiment, the third adhesive composite component is formed with a self-adhesive tape, in particular a fabric tape. The self-adhesive tape may, for example, be pressed, after the second adhesive composite component has been applied and cured, from the outside over the latter and adjacent regions of the housing component and thereby bonded thereto, and ensure the required water- and oxygen-leaktightness. A third adhesive composite component configured as a fabric tape, i.e. reinforced with a fabric, may additionally lead to extra stability for the overall adhesive composite. Optionally, the tape may be configured as a multilayered tape.

The third adhesive composite component, in particular when it is configured as a tape or fabric tape, may have a certain elasticity in order, for example, advantageously to be able to absorb and/or dampen vibrations acting on the battery cell from the outside. This may improve a longevity of the battery cell.

According to one embodiment, the housing is composed of two housing components configured as identical half-shells. The housing may in this case be formed in a straightforward way by connecting the two half-shells to one another mechanically stably as well as in a leaktight manner by means of the adhesive composite. Since the two half-shells are identical, only one type of housing component needs to be manufactured and provided, which may reduce manufacturing, logistical and storage costs.

According to one embodiment of the method according to the invention for manufacturing the battery cells, the three adhesive composite components are formed successively after one another. In other words, the adhesive composite is preferably not provided as a prefabricated unit with the housing components then being adhesively bonded therewith, but instead, during an adhesive bonding process, the three adhesive composite components are applied successively onto or over the housing components and only there form the finished adhesive composite. This may both simplify manufacture of the battery cell and assist an ultimately aimed-for achievement of functionalities, such as mechanical stabilization and leaktightness.

In particular, the individual method steps for forming the adhesive composite may be carried out by means of a single manufacturing apparatus specially adapted therefor.

According to one embodiment of the manufacturing apparatus according to the invention, the first delivery unit is configured to interpose the first adhesive composite component in the form of an elongate tape successively between the mutually opposing abutment faces of the housing components. Furthermore, the second delivery unit is configured to dispense the fluid material forming the second adhesive composite component over the first adhesive composite component and over the regions, adjacent to this first adhesive composite component, of the two housing components. The third delivery unit is configured to bond the third adhesive composite component in the form of an elongate self-adhesive tape successively from the outside onto the second adhesive composite component and onto the regions, adjacent to the second adhesive composite component, of the two housing components.

Such a manufacturing apparatus may preferably complete all the method steps required for the adhesive bonding of housing components in order to form a battery cell in a single method pass. It may therefore be used for rapid, efficient and/or economical cell manufacture.

It is pointed out that some of the possible features and advantages of the invention are described herein with reference to different embodiments of a battery cell, of a method for manufacturing a housing for a battery cell, and an apparatus for manufacturing a housing for a battery cell. A person skilled in the art will understand that the features may suitably be transposed, combined, adapted or replaced in order to obtain other embodiments of the invention.

BRIEF DESCRIPTION OF THE DRAWINGS

Embodiments of the invention will be described below with reference to the appended drawings, although neither the drawings nor the description are to be interpreted as restricting the invention.

The figures are merely schematic and not true to scale. In the figures, references which are the same denote features which are the same or have the same effect.

DETAILED DESCRIPTION

Figure 1:
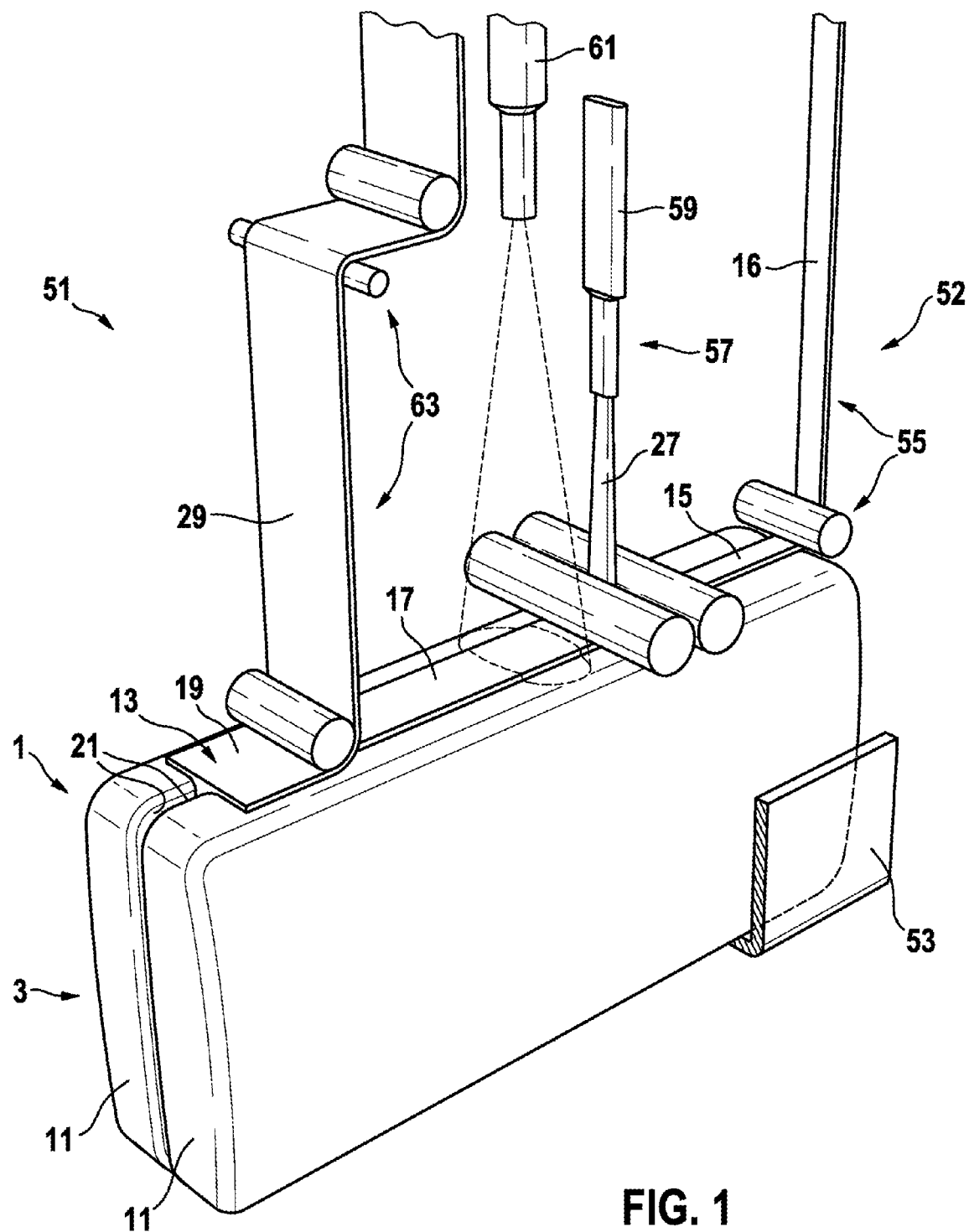
FIG. 1 illustrates in perspective view a method for manufacturing a housing for a battery cell, as well as components of an apparatus used therefor, according to one embodiment of the invention.
Figure 2:
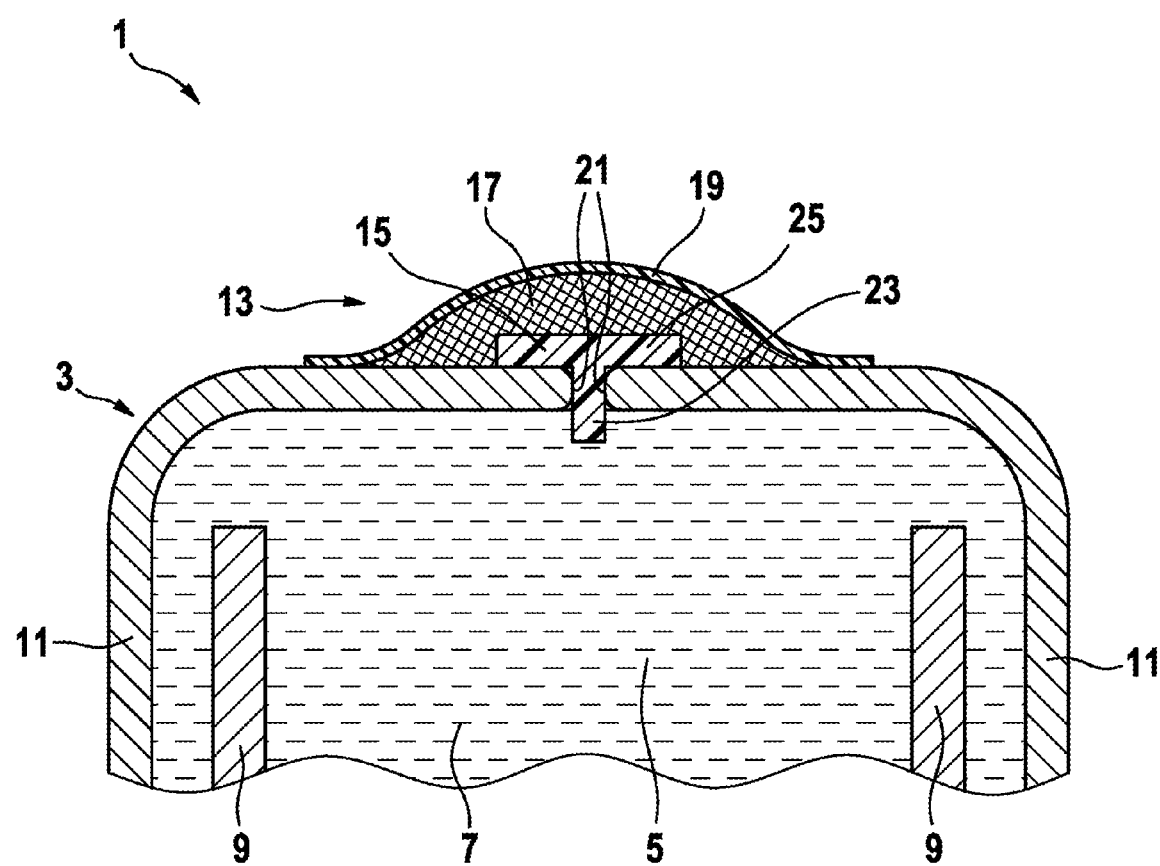
FIG. 2 shows a sectional view through a housing, and the adhesive composite thereof, of a battery cell according to the invention.

FIG. 1 illustrates manufacture of a battery cell 1 as well as an apparatus 51 used therefor according to embodiments of the present invention. FIG. 2 illustrates a region of a housing 3 of the battery cell 1 in cross section.

The housing 3 of the battery cell 1 encloses an interior 5 in which components of the battery cell 1, in particular its electrolyte 7 and its electrodes 9 (represented only very schematically for reasons of clarity), are contained. The housing 3 is in this case composed of housing components 11. In the example represented, the housing 3 is composed of two housing components 11 configured as identical half-shells.

In order to connect the housing components 11 to one another both stably and in a leaktight manner, they are adhesively bonded to one another with the aid of an adhesive composite 13. The adhesive composite 13 in this case has a three-layer structure with three adhesive composite components 15, 17, 19, and may be produced by means of an adhesive bonding device 52.

In order to be able to arrange the housing components 11 suitably during the adhesive bonding, the manufacturing apparatus 51 comprises a holding device 53 (represented only very schematically) for holding the housing components 11 in such a way that they oppose one another along abutment faces 21.

In order to manufacture the adhesive composite 13, the first adhesive composite component 15 is first interposed along the mutually opposing abutment faces 21 of the two housing components 11. In the example represented, to this end the first adhesive composite component 15 is arranged in the form of an elongate tape 16 with a T-shaped cross section between the two housing components 11 by a first delivery unit 55.

A vertical branch 23 of the T-shaped profile of the tape 16 is in this case inserted between the abutment faces 21 of the two housing components 11. Transverse branches 25 of the T-shaped profile of the tape 16 respectively bear on an outwardly directed surface of the two housing components 11. Because of this geometrical configuration, the first adhesive composite component 15 can on the one hand fill a gap extending between the abutment faces 21, and on the other hand position the two housing components 11 relative to one another, preferably at a suitable distance relative to one another, in order to avoid direct contact for the housing components 11.

The first adhesive composite component 15 consists of a material which is resistant to the electrolyte 7, for example of PTFE.

Subsequently, the second adhesive component 17 is applied from the outside over the first adhesive component 15 and over regions, adjacent to the latter, of the two housing components 11. The second adhesive component 17 is in this case formed by means of a fluidly processable substance, for example epoxy resin 27. With the aid of a second delivery unit 57, to this end the epoxy resin 27 in the liquid state is suitably applied and distributed by means of a dispenser 59 over the previously arranged first adhesive component 15, so that it also flows over side edges of this first adhesive component 15 and locally covers the outwardly directed surface of the housing components 11 there. The epoxy resin 27 applied in this way may subsequently be cured. For example, to this end it may be illuminated with a light source 61, in particular a UV light source. As an alternative, however, the epoxy resin 27 may also be cured in another way, i.e. for example thermally, by adding a curing agent, etc.

Lastly, with the aid of a third delivery unit 63, the third adhesive composite component 19 is applied over the previously applied second adhesive composite component 17 and regions, adjacent to the latter, of the two housing components 11. The third adhesive composite component 19 may in this case be applied in the form of a tape 29, in particular a fabric tape. Material and/or geometry of the third adhesive composite component 19 are in this case selected in such a way that it can ensure sufficient leaktightness to water and oxygen.

Lastly, it is to be pointed out that terms such as "having", "comprising", etc. do not exclude other elements or steps, and terms such as "a" or "an" do not exclude a multiplicity. References in the claims are not to be regarded as restrictive.

The invention claimed is:

1. A battery cell (1), comprising:
electrodes (9),
an electrolyte (7), and
a housing (3) which encloses the electrodes (9) and the electrolyte (7), the housing (3) being composed of at least first and second housing components (11),
characterized in that
the first and second housing components (11) each have an outer surface and are adhesively bonded to one another in a sealed manner by an adhesive composite (13) along mutually opposing abutment faces (21), the adhesive composite (13) comprising:
a first adhesive composite component (15), which is in part interposed between the mutually opposing abutment faces (21) of the housing components (11), which includes first and second portions contacting the outer surfaces of the first and second housing components (11), respectively, adjacent the mutually opposing abutment surfaces, and which is resistant and impermeable to the electrolyte (7),
a second adhesive composite component (17) which includes first and second portions contacting the outer surfaces of the first and second housing components (11), respectively, adjacent the first and second portions, respectively, of the first adhesive composite component (15), which includes a middle portion extending over the first adhesive composite component (15) and extending continuously from the first portion of the second adhesive composite (17) component to the second portion of the second adhesive composite component (17), and which consists of a fluidly processable, cured material, and
a third adhesive composite component (19), which includes first and second portions contacting the outer surfaces of the first and second housing components (11), respectively, adjacent the first and second portions, respectively, of the second adhesive composite component (17), which includes a middle portion extending over the second adhesive composite component (17) and extending continuously from the first portion of the third adhesive composite component (19) to the second portion of the third adhesive composite component (19), and which is water-impermeable and/or oxygen-impermeable.

2. The battery cell as claimed in claim 1, wherein the first adhesive composite component (15) has an essentially T-shaped cross section.

3. The battery cell as claimed in claim 1, wherein the housing components (11) consist of an electrically conductive material.

4. The battery cell as claimed in claim 1, wherein the first adhesive composite component (15) is formed with an electrically insulating material.

5. The battery cell as claimed in claim 1, wherein the first adhesive composite component (15) is formed with polytetrafluoroethylene.

6. The battery cell as claimed in claim 1, wherein the second adhesive composite component (17) is formed with epoxy resin (27).

7. The battery cell as claimed in claim 1, wherein the third adhesive composite component (19) is formed with a self-adhesive tape (29).

8. The battery cell as claimed in claim 1, wherein the housing (3) is composed of two housing components (11) configured as identical half-shells.

9. The battery cell as claimed in claim 1, wherein the housing components (11) consist of metal.

10. The battery cell as claimed in claim 1, wherein the third adhesive composite component (19) is formed with a self-adhesive tape fabric tape.

11. A method for manufacturing the housing (3) for the battery cell (1) as claimed in claim 1, the method comprising:

provision of the first and second housing components (11), which when assembled form the housing (3), arrangement of the first and second housing components (11) so as to oppose one another along the mutually opposing abutment faces (21), and adhesive bonding of the first and second housing components (11) to one another along the mutually opposing abutment faces (21) by the adhesive composite (13), wherein the adhesive bonding process comprises:

interposition of a part of the first adhesive composite component (15) between the mutually opposing abutment faces (21) of the housing components (11), the first adhesive composite component (15) being resistant to the electrolyte (7), to be contained in the housing (3), of the battery cell (1), application of the second adhesive composite component (17) from the outside over the first adhesive composite component (15) and over regions, adjacent to this first adhesive composite component (15), of the housing components (11), the second adhesive composite component (17) consisting of the fluidly processable, curable material, which is fluidly applied and then cured, and application of the third adhesive composite component (19) from the outside over the second adhesive composite component (17) and over regions, adjacent to the second adhesive composite component (17), of the two housing components (11), the third adhesive composite component (19) being water-impermeable and/or oxygen-impermeable.

12. The method as claimed in claim 11, wherein the three adhesive composite components (15, 17, 19) are formed successively after one another.

* * * * *